(12) United States Patent
Janakiraman et al.

(10) Patent No.: US 11,494,742 B2
(45) Date of Patent: Nov. 8, 2022

(54) DYNAMIC WORKPLACE SET-UP USING PARTICIPANT PREFERENCES

(71) Applicant: International Business Machines Corporation, Armonk, NY (US)

(72) Inventors: Janani Janakiraman, Austin, TX (US); Fang Lu, Billerica, MA (US); Nadiya Kochura, Bolton, MA (US); Su Liu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 16/561,074

(22) Filed: Sep. 5, 2019

(65) Prior Publication Data
US 2021/0073742 A1    Mar. 11, 2021

(51) Int. Cl.
G06Q 10/10       (2012.01)
G06Q 10/06       (2012.01)
H04L 67/50       (2022.01)

(52) U.S. Cl.
CPC ... G06Q 10/1095 (2013.01); G06Q 10/06315 (2013.01); H04L 67/535 (2022.05)

(58) Field of Classification Search
None
See application file for complete search history.

(56) References Cited

U.S. PATENT DOCUMENTS 5,634,016 A * 5/1997 Steadham, Jr. ........ G06Q 10/02
                                                                        715/848
7,479,958 B1 * 1/2009 Suzuki .................. A63F 13/822
                                                                        715/788

(Continued)

FOREIGN PATENT DOCUMENTS

CN    108764807 A  * 11/2018
CN    109816320 A  *  5/2019
(Continued)

OTHER PUBLICATIONS

M. Saravanan and A. Das, "Smart real-time meeting room," 2017 IEEE Region 10 Symposium (TENSYMP), 2017, pp. 1-5, doi: 10.1109/TENCONSpring.2017.8070069 (Year: 2017).*

(Continued)

*Primary Examiner* — Shelby A Turner
(74) *Attorney, Agent, or Firm* — Joseph P. Curcuru

(57) ABSTRACT

Embodiments of the present invention describe creating a monitoring package by integrating a personal information management system (PIMS) and a social network profile for a user. Embodiments comprise continuously monitoring e-mail messages, calendar entries, social media posts, and social media comments of the integrated PIMS and social network profile, collecting participant preference information and meeting data from the monitoring package, identifying an upcoming meeting for the user according to the meeting data, and determining a list of participants for the upcoming meeting based on conversation threads associated with the upcoming meeting collected from the monitoring package. Embodiments further comprise collecting a set of participant preference information for the participants in the list of participants including the participant preference information for the user, determining a workplace set-up for the upcoming meeting based on the set of participant preference information, and outputting a workplace arrangement for the upcoming meeting.

20 Claims, 3 Drawing Sheets

(56) References Cited

U.S. PATENT DOCUMENTS

| | | | |
|---|---|---|---|
| 7,707,256 B2 | 4/2010 | Rollin | |
| 8,717,178 B2* | 5/2014 | Fujimoto | G06Q 10/06 340/572.1 |
| 9,760,870 B2 | 9/2017 | Norton | |
| 9,955,318 B1* | 4/2018 | Scheper | G06Q 10/063114 |
| 10,225,707 B1* | 3/2019 | Scheper | H04W 4/024 |
| 10,958,457 B1* | 3/2021 | Davis | G06Q 10/1095 |
| 2008/0201196 A1* | 8/2008 | Rowland | G06Q 10/109 705/7.13 |
| 2009/0265280 A1* | 10/2009 | Taneja | G06Q 50/188 705/80 |
| 2010/0185933 A1* | 7/2010 | Coffman | G06Q 10/10 707/769 |
| 2011/0184768 A1* | 7/2011 | Norton | G06Q 10/109 705/5 |
| 2012/0179502 A1* | 7/2012 | Farooq | H04L 12/1818 705/7.13 |
| 2012/0293605 A1 | 11/2012 | Seferian | |
| 2013/0263020 A1* | 10/2013 | Heiferman | H04L 51/52 715/753 |
| 2014/0358292 A1* | 12/2014 | Bradley | F24F 11/30 700/276 |
| 2016/0080907 A1* | 3/2016 | Saleem | H04W 4/70 455/456.1 |
| 2016/0098687 A1* | 4/2016 | Lamons | G06Q 10/1095 705/7.19 |
| 2017/0006162 A1 | 1/2017 | Bargetzi | |
| 2017/0316383 A1* | 11/2017 | Naganathan | G06Q 10/1095 |
| 2018/0018636 A1* | 1/2018 | Bisti | G06Q 10/1095 |
| 2018/0046957 A1* | 2/2018 | Yaari | G06Q 10/1095 |
| 2018/0123997 A1* | 5/2018 | Celedonia | G06Q 10/10 |
| 2018/0174112 A1* | 6/2018 | Breedvelt-Schouten | G06Q 50/01 |
| 2018/0204147 A1* | 7/2018 | Koitz | H04L 67/306 |
| 2018/0204162 A1* | 7/2018 | Endel | G06Q 10/06315 |
| 2018/0211660 A1* | 7/2018 | Bastide | A61M 21/02 |
| 2019/0172165 A1* | 6/2019 | Verteletskyi | G01C 21/206 |
| 2019/0272509 A1* | 9/2019 | Livnat | H04W 4/33 |
| 2019/0332988 A1* | 10/2019 | Adamson | G06Q 10/1095 |
| 2020/0064790 A1* | 2/2020 | Galvez | G06Q 10/1095 |
| 2020/0200422 A1* | 6/2020 | Xu | F24F 11/64 |
| 2020/0234201 A1* | 7/2020 | Dorna | G06Q 10/02 |
| 2020/0302344 A1* | 9/2020 | Just | G06F 21/34 |
| 2020/0380431 A1* | 12/2020 | Higley | G06F 16/9535 |
| 2022/0222591 A1* | 7/2022 | Petroulas | G06Q 10/04 |

FOREIGN PATENT DOCUMENTS

| | | | | |
|---|---|---|---|---|
| CN | 109819195 A | * | 5/2019 | |
| EP | 3696472 A1 | * | 8/2020 | |
| WO | WO-2016209711 A | * | 12/2016 | G06Q 10/1095 |

OTHER PUBLICATIONS

Anonymous "System and Method for Dynamic Resource Inference in Automatic Conference Scheduling", IP.com PAD, Jun. 21 (2011), online: https://ip.com/IPCOM/000208038 (Year: 2011).*

Nawaz, Tahir, Fabio Poiesi, and Andrea Cavallaro. "Measures of effective video tracking." IEEE Transactions on Image Processing 23.1 (2013): 376-388. (Year: 2013).*

Trucco, Emanuele, and Konstantinos Plakas. "Video tracking: a concise survey." IEEE Journal of oceanic engineering 31.2 (2006): 520-529. (Year: 2006).*

Kortuem, Gerd, et al. "Smart objects as building blocks for the internet of things." IEEE Internet Computing 14.1 (2009): 44-51. (Year: 2009).*

"The Windows Interface Guidelines—A Guide for Designing Software", MicrosoftWindows, Feb. 1995, https://www.ics.uci.edu/~kobsa/courses/ICS104/course-notes/Microsoft_WindowsGuidelines.pdf (Year: 1995).*

Morgan, Jacob, "How The Physical Workspace Impacts The Employee Experience", <https://www.forbes.com/sites/jacobmorgan/2015/12/03/how-the-physical-workspace-impacts-the-employee-experience/2/#571d657f/b9c>, Dec. 3, 2015, 9 pages.

* cited by examiner

DYNAMIC WORKPLACE SET-UP USING PARTICIPANT PREFERENCES

BACKGROUND OF THE INVENTION

The present invention relates generally to the field of workplace environments, and more particularly to intelligently adjusting workplace environments to fit participants preferences.

A workplace is a location where someone performs work. Such a place can range from a home office to a large office building or factory. For industrialized societies, the workplace is one of the most important social spaces other than the home. The development of new communication technologies has led to the development of the virtual workplace, a workplace that is not located in any one physical space. Oftentimes a work environment involves the physical geographical location as well as the immediate surroundings of the workplace, such as a construction site or office building. A work environment typically involves other factors relating to the workplace, such as the quality of the air, noise level, and additional perks and benefits such as childcare provision, snacks and beverages, and/or parking spaces.

SUMMARY

Embodiments of the present invention disclose a method, a computer program product, and a system for creating a monitoring package by integrating a personal information management system (PIMS) and a social network profile for a user, wherein creating the monitoring package comprises: continuously monitoring e-mail messages, calendar entries, social media posts, and social media comments of the integrated PIMS and social network profile; collecting participant preference information and meeting data from the monitoring package; identifying an upcoming meeting for the user according to the meeting data; determining a list of participants for the upcoming meeting based on conversation threads associated with the upcoming meeting collected from the monitoring package; collecting a set of participant preference information for the participants in the list of participants including the participant preference information for the user; determining a workplace set-up for the upcoming meeting based on the set of participant preference information; and outputting a workplace arrangement for the upcoming meeting.

DETAILED DESCRIPTION

Figure 1:
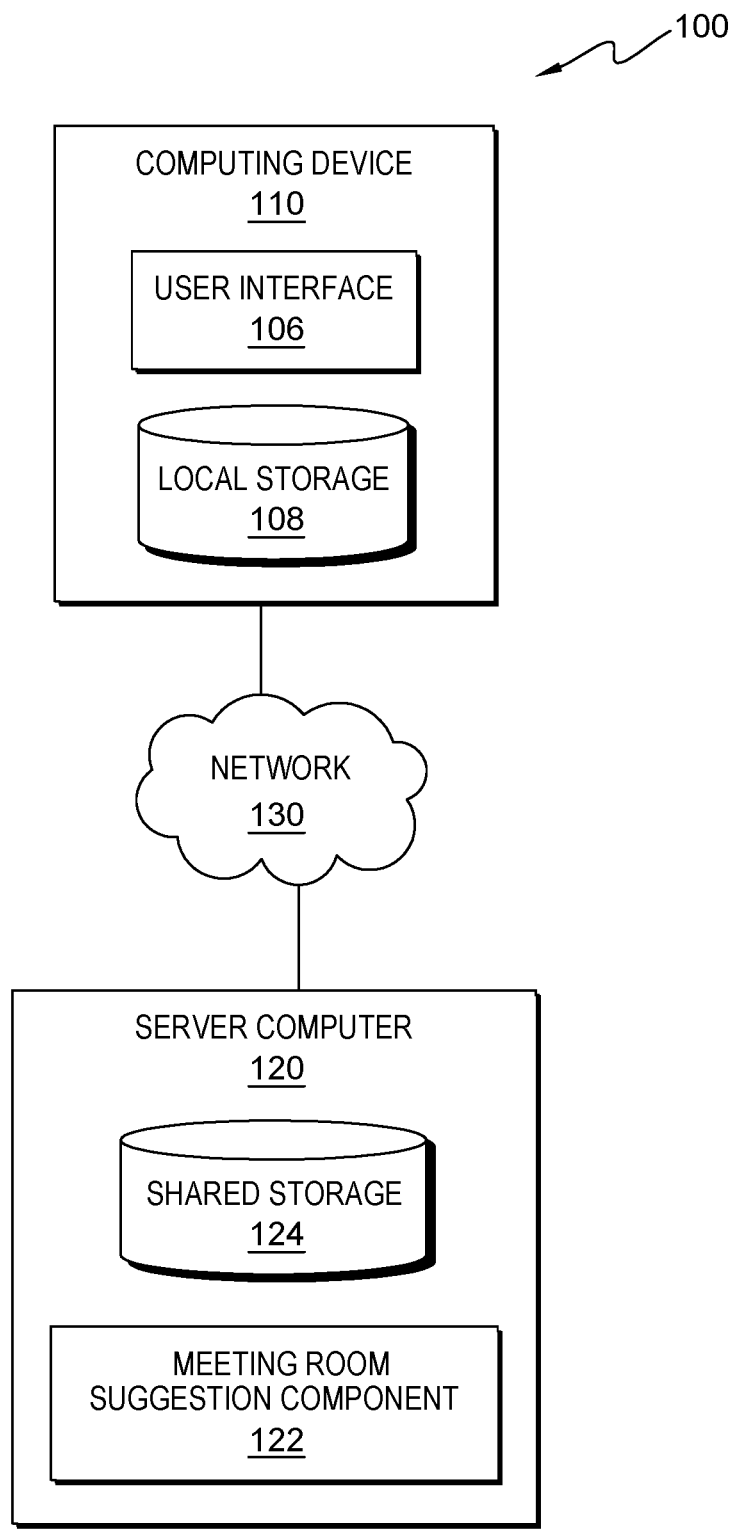
FIG. 1 is a functional block diagram illustrating a distributed data processing environment, for a meeting room suggestion component, in accordance with an embodiment of the present invention.

Different groups of people prefer different types of working environments. Some prefer to work in the open space and others prefer to work in an office or cubicle type of environment. Work environment preferences can affect the outcome of a group meeting as well as productivity. Embodiments of the present invention can suggest the meeting space set up by analyzing the meeting data such as the date, time, and participants that will attend the meeting in person. Embodiments of the present invention can consider and/or arrange the lighting settings of one or more rooms (e.g., one or more conference rooms) to accommodate the personal preferences and meeting room preferences of the one or more meeting participants (i.e., users) to ensure productivity throughout the meeting. It should be noted that participant(s) encompass persons who will be attending a meeting either virtually or in-person (i.e., physically present in the room).

Embodiments of the present invention can integrate with one or more personal information management systems (PIMS) such as electronic mail (e-mail) and calendar application, herein collectively referred to as participant data. Embodiments of the present invention can integrate with one or more social media networks. Embodiments of the present invention can continuously monitor meeting preferences data (i.e., participant preference information). Embodiments of the present invention can establish and generate a data model for one or more participants and save the data and data model in a central repository. Embodiments of the present invention can detect an upcoming meeting. Embodiments of the present invention can determine/identify the list of in-person participants based on the received responses to the meeting. In some embodiments of the present invention, presence detection of participants can be used in real time to determine who is entering or who is leaving the room. Embodiments of the present invention can analyze the preferences about the in-person participants. For example, whether the person prefers to work in a quieter space or in an open space, the lighting level of the meeting room and etc. Embodiments of the present invention can aggregate the preferences of the in-person participants.

Embodiments of the present invention can identify the common preferences among the in-person participants. Embodiments of the present invention can analyze the information about the meeting space that is listed in the invitation to determine what settings can be configured. Embodiments of the present invention can suggests/output one or more space layouts and configurations of the meeting room for one or more upcoming/scheduled meetings. For example, the table and seats layout, the level of lighting, room temperature, type of room (e.g., open space or confined office, etc. Certain settings (e.g., table layout) can be acquired by embodiments of the present invention based on a prior knowledge of list of in-person participants while other settings (e.g., lighting/temp) can be dynamically adjusted based on the real time detection of participants. Embodiments of the present invention can keep track of the meeting outcome and people's feedback after the meeting through text and voice communications. Embodiments of the present invention can suggest reusing certain settings that help generate the positive outcome and feedback for future meetings.

It should be noted herein that in the described embodiments, participating parties have consented to being recorded and monitored, and participating parties are aware of the potential that such recording and monitoring may be taking place. In various embodiments, for example, when downloading or operating an embodiment of the present invention, the embodiment of the invention presents a terms and conditions prompt enabling the driver to opt-in or opt-out of participation. Similarly, in various embodiments, e-mails and texts begin with a written notification that the participants information may be recorded or monitored and may be saved, for the purpose of generating data models and personal profiles for each participant. These embodiments may also include periodic reminders of such recording and monitoring throughout the course of any such use. Certain embodiments may also include regular (e.g. daily, weekly, monthly) reminders to the participating parties that they have consented to being recorded and monitored for traffic monitoring and navigation purposes and may provide the participating parties with the opportunity to opt-out of such recording and monitoring if desired. Furthermore, to the extent that any non-participating parties' actions are monitored (for example, a personal e-mail exchange), such monitoring takes place for the limited purpose of providing profile assistance to a participating party, with protections in place to prevent the unauthorized use or disclosure of any data for which an individual might have a certain expectation of privacy.

Implementation of embodiments of the invention may take a variety of forms, and exemplary implementation details are discussed subsequently with reference to the figures (i.e., FIG. 1-FIG. 3).

FIG. 1 is a functional block diagram illustrating a distributed data processing environment, generally designated 100, for a meeting room suggestion component, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110, and server computer 120 interconnected over network 130.

Network 130 can be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and can include wired, wireless, or fiber optic connections. Network 130 can include one or more wired and/or wireless networks that can receive and transmit data, voice, and/or video signals, including multimedia signals that include voice, data, text and/or video information. In various embodiments, network 130 can be a peer to peer (P2P) network. In general, network 130 can be any combination of connections and protocols that will support communications between computing device 110, meeting room suggestion component (suggestion component) 122, local storage 108, shared storage 124, server computer 120, any other computing devices or other storage devices (not shown in FIG. 1), or any combination therein within distributed data processing environment 100.

In various embodiments, computing device 110 can be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), and/or any programmable electronic computing device capable of communicating with various components and devices within distributed data processing environment 100, via network 130 or any combination therein. In general, computing device 110 can be representative of any programmable computing device or a combination of programmable computing devices capable of executing machine-readable program instructions and communicating with drivers of other computing devices via network 130, capable of executing machine-readable program instructions and communicating with server computer 120.

In other embodiments, computing device 110 can represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. In the depicted embodiment, computing device 110 can include user interface (UI) 106 and local storage 108. In various embodiments, not depicted in FIG. 1, computing device 110 can have one or more user interfaces. In other embodiments, not depicted in FIG. 1, distributed data processing environment 100 can comprise one or more computing devices, one or more server computers, and/or one or more networks. In various embodiments, computing device 110 can be in or integrated with a smart room. Computing device 110 can include internal and external hardware components, as depicted, and described in further detail with respect to FIG. 3.

UI 106 provides an interface for computing device 110 and enables participants to interact with suggestion component 122 via network 130. UI 106 enables the vehicle operator to interact with computing device 110 or server computer 120. In various embodiments, UI 106 can enable a driver, a client, or both to interact with suggestion component 122, computing device 110, server computer 120, or any combination thereof. For example, a computer system and display screen enabling a driver to send program instructions, receive program instructions, send messages, receive messages, update data, send data, input data, edit data, collect data, receive data, or any combination thereof from a server or a program. In one embodiment, UI 106 can be a graphical user interface (GUI) or a web user interface (WUI) and can display text, documents, web browser windows, conference room settings, personal preferences, personality traits, application interfaces, and instructions for operation. UI 106 can include information such as graphic, text, and sound. UI 106 can enable a program to be presented to a participant and enable control sequences the participant employs to control the program. In another embodiment, UI 106 can be a mobile application software providing an interface between a participant of computing device 110 and server computer 120. Mobile application software, or an "app," can be a computer program designed to run on smart phones, tablet computers and other computing devices. In an embodiment, UI 106 can enable the participant of computing device 110 to send data, input data, edit data (annotations), collect data and/or receive data.

Server computer 120 can be a standalone computing device, a management server, a web server, a mobile computing device, a central server, one or more client servers, or any other electronic device or computing system capable of receiving, sending, and processing data. In other embodiments, server computer 120 can represent a server computing system utilizing multiple computers such as, but not limited to, a server system, such as in a cloud computing environment. In another embodiment, server computer 120 can represent a computing system utilizing clustered computers and components (e.g., database server computers, application server computers, etc.) that act as a single pool of seamless resources when accessed within distributed data processing environment 100. Server computer 120 can include internal and external hardware components, as depicted, and described in further detail with respect to FIG. 4.

Each of shared storage 124 and local storage 108 can be a data/knowledge repository and a database that can be written and read by one or a combination of suggestion component 122, server computer 120, and computing device 110. In the depicted embodiment, shared storage 124 resides on server computer 120 and local storage 108 resides on computing device 110. In another embodiment, shared storage 124 and local storage 108 can each reside elsewhere within distributed data processing environment 100, provided that each can access at least one of computing device 110 and server computer 120 and each are accessible by at least one of computing device 110 and server computer 120. Shared storage 124 and local storage 108 can each be implemented with any type of storage device capable of storing data and configuration files that can be accessed and utilized by server computer 120, computing device 110, or any combination thereof, such as, but not limited to, a database server, a hard disk drive, or a flash memory. In other embodiments, shared storage 124 and local storage 108 can each be a hard drive, a memory card, a computer output to laser disc (cold storage), or any form of data storage known in the art. In some embodiments, shared storage 124 and local storage 108 can each be one or more cloud storage systems or databases linked to a cloud network.

In the depicted embodiment, suggestion component 122 executes on server computer 120. In other embodiments, suggestion component 122 can be on computing device 110, one or more computing devices 110 or one or more server computers 120 (not depicted in FIG. 1), or anywhere within distributed data processing environment 100, provided that suggestion component 122 can access at least one of computing device 110 and server computer 120, and is accessible by at least one of computing device 110 and server computer 120. In some embodiments, suggestion component 122 can be on one or more servers, one or more computing devices, or any combination thereof. In some embodiments, not depicted in FIG. 1, suggestion component 122 can be a standalone component on computing device 110.

In various embodiments, suggestion component 122 can integrate with one or more PIMS such as e-mail and calendar applications, in which integrating with one or more PIMS enables suggestion component 122 to have read/write access to the participants calendar and e-mail applications. In various embodiments, PIMS can create a monitoring package, wherein the monitoring package comprises monitoring and collecting a participant's e-mail messages and calendar entries. In various embodiments, suggestion component 122 can access and update a participant's calendar, wherein suggestion component 122 can update and monitor meeting times and locations bases on received e-mails. In various embodiments, suggestion component 122 can access a participant's calendar and e-mail via access credentials provided by the participant, wherein the access credentials can be stored on shared storage 124 for later access by suggestion component 122. In some embodiments, suggestion component 122 can use the PIMS to continuously monitor, detect, track, and update upcoming meetings and other participant data.

In various embodiments, suggestion component 122 can be integrated into a room control hub (e.g., smart room hub or office management system) and can arrange a conference room, wherein arranging a conference room comprises: arranging the light settings (e.g., brightness, color, position, etc.) in the conference room to satisfy/match one or more participants conference room preferences, setting up and/or establishing the conference room seating arrangement (e.g., seating chart) based on the saved personality traits of the one or more participants attending the meeting and positional hierarchy, setting up the presentation monitor, and/or adjusting the temperature of the conference room. Personality traits can be a component of personal preferences. Personality traits are aspects of a person's behavior (e.g., sociable, reserved, quiet, outgoing, active, talkative, impatient, etc.).

Personal preferences are specific likes and dislikes of an individual (i.e., participant). Personal preferences can be, but are not limited to: room temperature, type of room, type of music, type of chair, visual cues, and/or any other personal preference known in the art. For example, a participant personally prefers a meeting room with glass walls and air conditioning. In various embodiments, suggestion component 122 can adjust the lighting settings of the conference room to accommodate the preferences of the one or more participants attending the meeting. It should be noted that a conference room can be an office room, a meeting room, a cubical, a designated out door area, an open concept room, a conference hall, a virtual conference room, and/or any place where a meeting can be held that is known in the art. In one particular embodiment, suggestion component 122 can suggest, adjust, and/or arrange a conference room based on the person running the meeting or based on the highest-ranking person attending the meeting.

In various embodiments, suggestion component 122 can integrate with one or more social media networks by receiving permission by a participant to access the participants one or more social media accounts. In various embodiment, suggestion component 122 can access a participant's one or more social media networks via access credentials provided by the participant, wherein the access credentials can be stored on shared storage 124 or local storage 108 for later access by suggestion component 122. In various embodiments, PIMS can create a monitoring package, wherein the monitoring package comprises monitoring and collecting a participant's e-mails, calendar entries, social media posts, social media comments, and social media messages. In various embodiments, suggestion component 122 integration with a participants one or more social media networks enables suggestion component 122 to actively monitor the participants behavior and personality traits on the one or more social media networks by monitoring and analyzing the participants posts, comments, and messages. In various embodiments, suggestion component 122 can detect an upcoming meeting based on data found while monitoring a participant's activity and/or notifications on one or more social media networks.

In various embodiments, suggestion component 122 can establish and generate a data model for one or more participants and save the data and data model in a central repository (e.g., local storage 106 or shared storage 124. The generated data model can be a conceptual representation of the data objects of one or more participants that are stored in one or more databases (e.g., local storage 108 and/or shared storage 124). In various embodiments, suggestion component 122 can determine/identify the list of in-person participants based on the received responses to the meeting invitation. Additionally, in various embodiments, suggestion component 122 can use presence detection, as it is known in the art, of participants in real time to determine who is entered or who has exited the room.

In various embodiments, suggestion component 122 can store a list of room amenities and room specifications for a plurality of conference rooms on local storage 108 and/or shared storage 124. For example, suggestion component 122 keeps a log of what type of chairs are in a conference room, how large the conference room is, weather the conference room has comprises air conditioning or heating, the type of tv monitor or projector, the color of the walls, the type room, location of the room, internet access, telecommunication enablement, if a video camera, speaker, and/or microphone are present, type of flooring, and/or accessibility of the conference room. In various embodiments, the stored list of room amenities and room specifications can be retrieved by suggestion component 122 to arrange and/or suggest a conference room.

In various embodiments, suggestion component 122 can analyze the preferences about one or more in-person participants. For example, whether the person prefers to work in a quieter space or in an open space, the lighting level of the meeting room and etc. In various embodiments, suggestion component 122 can aggregate the preferences of one or more in-person participants and/or virtual participants. In various embodiments, suggestion component 122 can consider participant preferences (e.g., personal preferences and conference room preferences) during lighting set up and conference room layout set up. Conference room preferences are specific likes and dislikes. In various embodiments, suggestion component 122 can analyze date and time information, information about the purpose and subject of the meeting, the meeting agenda, and the participants who will attend the meeting (i.e., participants). In various embodiments, suggestion component 122 can determine the purpose, subject, and/or agenda of one or more meetings. In various embodiments, suggestion component 122 can optimize templates and determine the roles of the participants.

In various embodiments, suggestion component 122 can collect participant preference information via text analysis of social media posts from one or more integrated social media networks, image analysis of participants in regular office space, prior feedback from participants and information about the roles of the participants attending the meeting, wherein participant preference information comprises: personal preferences, social preferences, workspace preferences, preference list of configurable items in a conference room, preferences and personal styles on social media, the participants' personal settings, and conference room preferences. In various embodiments, suggestion component 122 can provide a highly configurable team based working environment based on the resources available. In some embodiments, suggestion component 122 can identify the purpose and/or agenda of the meeting and determine an optimal meeting or conference room based on the participants personal preferences and meeting preference of one or more participants attending the meeting.

In various embodiments, suggestion component 122 can determine the list of in-person participants by monitoring participation attendance in real time by sensing who enters the room, via a camera/video component not depicted in FIG. 1, tracking employee work/meeting login and/or tracking employee badge scanning to enter a conference room. In various embodiments, suggestion component 122 can retrieve and analyze previously saved conference room settings for similar meetings associated with similar participants. In various embodiments, suggestion component 122 can collect participant preference information from one or more participants attending the meeting either online or in person to enable the output of a customized meeting space for the one or more participants. In various embodiments, suggestion component 122 can continuously collect participant preference information when participants opt-in and creates participant profiles that continually update based on the continuously collected participant preference information.

In various embodiments suggestion component 122 can integrate with one or more social media networks by enable the participant to sync suggestion component 122 to the participants one or more social media accounts. In various embodiments, suggestion component 122 can collect participant preference information by enabling the participants to enter preferences onto a list of configurable items for a conference room setup; monitoring social media to analyze and collect participant social preferences via text analysis and tagging analysis. For example, people may express their preferences on social networking/media websites in terms of preferred workspace (e.g., open workspace vs. closed workspace). Additional, in various embodiments, image analysis can also be done to determine participant preferences. For example, a picture of an employee wear headphones in an open workspace results in suggestion component 122 determining that the open workspace is noisy, and that the employee probably prefers a quite closed office space for meetings.

In various embodiments, suggestion component 122 can identify the common preferences among the in-person participants by comparing the participant preference information of one or more participants attending the meeting either virtually or in-person. In various embodiments, suggestion component 122 can determine the intersection of the preferences of the in-person participants and have a predetermined weighted scale to focus on the prioritized preferences according to meeting organizer, required invitees, and optional invitees. In other embodiments, the prioritized preferences can be based on a pre-defined hierarchy of participants (e.g., executives, managers, honored guests, the presenter, etc.). In various embodiments, suggestion component 122 can determine the intersection of preferences of the in-person participants by comparing the preferences of the in-person participants and identifying the overlapping preferences among the in-person participants. In various embodiments, suggestion component 122 can store the identified overlapping preferences (i.e., determined intersection of preferences) of the in-person participants on shared storage 124 to be used again or referenced in the future.

In various embodiments, suggestion component 122 can identify the purpose of one or more meetings by analyzing and identifying the subject line of the e-mail invitation and the agenda related to the meeting and identifying the people invited to the meeting, both virtually and in-person (i.e., participants). In some embodiments, suggestion component 122 can analyze the roles of the participants. For example, suggestion component 122 analyzes and identifies the proposed meeting is a sales meeting with multiple clients. In various embodiments, suggestion component 122 can identify meeting details based on the identified data in the meeting invitation, meeting agenda, identified participants, and identified roles of the identified participants.

In various embodiments, suggestion component 122 can analyzes the characteristics of a conference room to determine an optimal setup based on one or more participants conference room preferences and personal preferences, wherein the characteristics of a conference room comprise, but are not limited to: table/seats layout (theater style, U-shape), lightning level, temperature level, variety of furniture type for different types of the meetings, seating arrangement, size of the room, colors in the room (calm. cheerful), and/or type of equipment (e.g., type of projector, speaker system, camera system, communication system, presentation screen/monitor, etc.).

In various embodiments, suggestion component 122 can map one or more meetings to an optimal setup. In various embodiments, suggestion component 122 can map the one or more meetings to an optimal setup by mapping the identified meeting details to a set of items that can be useful to configure one or more meeting rooms. For example, dynamic artwork on the walls based on what participants would like to see, room temperature, room type, seating arrangement, lighting, and presentation set-up.

In various embodiments, suggestion component 122 can determine the overall preferred settings of one or more participants. In various embodiments, suggestion component 122 can generate and output one or more suggested layouts for one or more meets, wherein the generated and outputted one or more suggested layouts can be displayed as one or more interactive prompts to the participant, via UI 106. In one particular embodiment, the displayed interactive prompts are responsive to the participants selection. In various embodiments, suggestion component 122 can proactively select, recommend, and/or customize a workspace for a given event by referring to different room styles previously stored on local storage 108 and/or shared storage 124 based on the meeting time and participants information. In various embodiments, suggestion component 122 can predefine a set of layout patterns based on the available resources which can be associated with the known participants preferences. The predefined layout patterns can be further optimized through adaptive self-learning services.

In various embodiments, suggestion component 122 can acquire one or more settings (e.g., table layout) from prior knowledge of list of in-person participants stored on local storage 106 and/or shared storage 124 while other settings (e.g., lighting/temp) can be dynamically adjusted based on the real time detection of participants. In various embodiments, suggestion component 122 can keep track of the meeting outcome and participants feedback after the meeting through text and voice communications and store the collected participant feedback on one or more databases (e.g., local storage 106 and/or shared storage 124). For example, conducting text and voice surveys or analyzing e-mail and phone call conversations relating to a particular meeting.

In various embodiments, suggestion component 122 can suggest reusing certain settings that help generate the positive outcome and feedback for future meetings by evaluating the effectiveness of the meeting by following up with the meeting agenda and goals. Additionally, in various embodiments, suggestion component 122 can collect and analyze explicit feedback provided by the participant's comments, in which suggestion component 122 can solicit comments by generating prompts and/or e-mailing surveys to participants. In various embodiments, suggestion component 122 can compare a current meeting outcome to a similar previously conducted meetings outcome to measure the current meetings effectiveness.

Figure 2:
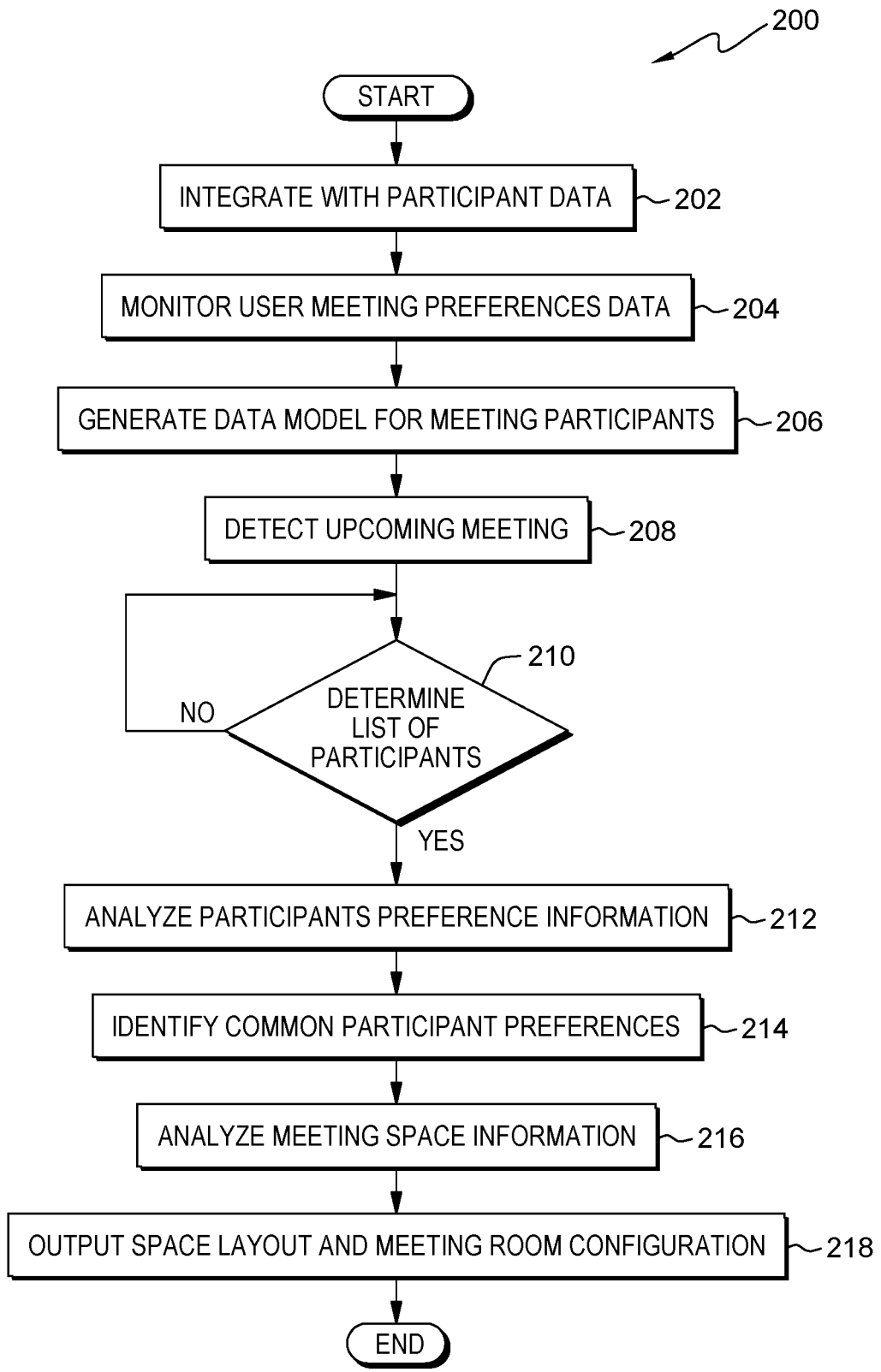
FIG. 2 illustrates operational steps of the meeting room suggestion component, in communication with a server computer within the distributed data processing environment of FIG. 1, for setting up a room, in accordance with an embodiment of the present invention.

FIG. 2 illustrates operational steps of suggestion component 122, generally designated 200, on server computer 120 within distributed data processing environment 100 of FIG. 1 for setting up a room, in accordance with an embodiment of the present invention. FIG. 2 provides an illustration of one implementation and does not imply any limitations with regard to the environments in which different embodiments can be implemented. Many modifications to the depicted environment can be made by those skilled in the art without departing from the scope of the invention as recited by the claims.

In step 202, suggestion component 122 integrates with participant data. In various embodiments, suggestion component 122 can integrate one or more participants data either manually or automatically. In other embodiments, suggestion component 122 can integrate with a participants one or more social media/social network profiles.

In step 204, suggestion component 122 monitors participant preference information. In various embodiments, suggestion component 122 can continuously monitor participant preference information and participant data. In various embodiments, suggestion component 122 can continuously collect participant preference information while monitoring participant preference information.

In step 206, suggestion component 122 generate a data model for meeting participants. In various embodiments, suggestion component 122 can generate one or more data model for one or more meeting participants based on the collected participant preference information.

In step 208, suggestion component 122 detects upcoming meeting. In various embodiments, suggestion component 122 can detect one or more upcoming meetings based on text analysis of e-mail meeting invitations based on the participants monitored communications.

In step 210, suggestion component 122 determines list of participants. In various embodiments, suggestion component 122 can determine the list of participants both in-person and virtually, via text analysis of confirmed RSVPS and one or more e-mail threads related to the particular meeting. In various embodiments, In step 212, suggestion component 122 analyzes participants preference information. In various embodiments, suggestion component 122 can retrieve participant preferences from local storage 108 and/or shared storage 124 and analyze one or more participants attending the meetings preference information.

In step 214, suggestion component 122 identifies common participant preferences. In various embodiments, suggestion component 122 can identify one or more common participant preferences by comparing the participant preference information or two or more participants.

In step 216, suggestion component 122 analyzes meeting space information. In various embodiments, suggestion component 122 can analyze the meeting space information of one or more meeting spaces.

In step 218, suggestion component 122 outputs space layout and meeting room configuration. suggestion component 122 can output one or more space layouts and meeting room configurations based on the identified meeting participants, identified common participant preferences, and meeting space information. In various embodiments, suggestion component 122 can store the one or more output space layouts and meeting room configurations to local storage 106 and/or shared storage 124, wherein the stored one or more space layouts and meeting room configurations can be retrieved for future use and/or analysis. In various embodiments, suggestion component 122 can generate and collect participant feedback for meetings, wherein suggestion component 122 can compare current meeting feedback to a similar previously conducted meeting feedback to measure the current meeting effectiveness.

Figure 3:
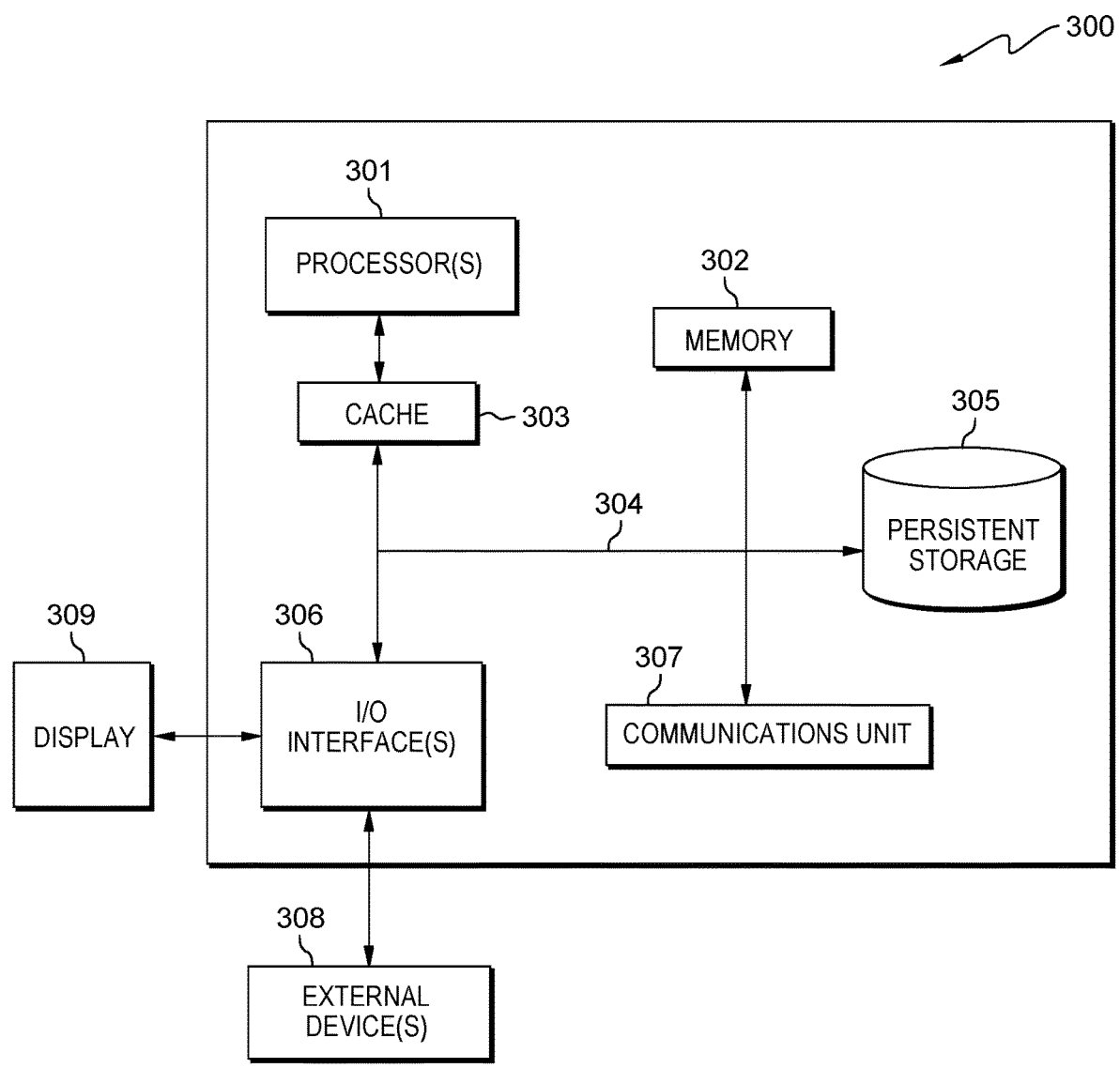
FIG. 3 depicts a block diagram of components of the server computer executing the meeting room suggestion component within the distributed data processing environment of FIG. 1, in accordance with an embodiment of the present invention.

FIG. 3 depicts a block diagram of components of server computer 120 and computing device 110 executing suggestion component 122, generally designated 300, within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

FIG. 3 depicts computer system 300, where server computer 120 represents an example of computer system 300 that includes INC 112. The computer system includes processors 301, cache 303, memory 302, persistent storage 305, communications unit 307, input/output (I/O) interface(s) 306, display 309, external device(s) 308 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications, and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention can be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 305 can also be removable. For example, a removable hard drive can be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 can provide communications through the use of either or both physical and wireless communications links. Program instructions and data used to practice embodiments of the present invention can be downloaded to persistent storage 305 through communications unit 307.

I/O interface(s) 306 enables for input and output of data with other devices that can be connected to each computer system. For example, I/O interface 306 can provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a driver and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It can also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations can be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   creating a monitoring package by integrating a personal information management system (PIMS) and a social network profile for a user, wherein creating the monitoring package comprises:
      continuously monitoring e-mail messages, calendar entries, social media posts, and social media comments of the integrated PIMS and social network profile;
      collecting participant preference information and meeting data from the monitoring package by enabling participants to enter preferences onto a list of configurable items for a conference room setup; and
      collecting a set of participant preference information for the participants on a list of participants including the participant preference information for the user;
   identifying an upcoming meeting for the user according to the meeting data;
   determining the list of participants for the upcoming meeting based on conversation threads associated with the upcoming meeting collected from the monitoring package;
   determining a workplace set-up for the upcoming meeting based on the set of participant preference information;
   dynamically adjusting lights of a room in real-time based on the set of participant preference information;
   outputting a generated custom and proactively selected workplace arrangement for a given event based at least in part on previously stored room styles and the determined workplace set-up for the upcoming meeting, meeting time, and participants information; and
   arranging, through a control hub, a conference room, wherein arranging the conference room comprises:
      establishing the conference room seating arrangement based on saved personality traits of the participants attending the meeting and positional hierarchy.

2. The computer-implemented method of claim 1 further comprising:
   generating a data model for the participants based on the set of participant preference information and participant data.

3. The computer-implemented method of claim 1, further comprising
determining an overall preferred setting of the participants attending the upcoming meeting, wherein determining the overall preferred settings comprises:
analyzing the set of participant preference information;
intersecting the participant preference information of the participants attending the upcoming meeting; and
weighing the participant preference information of the participants attending the detected upcoming meeting based on participant hierarchy.

4. The computer-implemented method of claim 3, wherein intersecting further comprises:
identifying common characteristics in the participant preference information.

5. The computer-implemented method of claim 1 further comprising:
analyzing meeting space information.

6. The computer-implemented method of claim 1, wherein integrating and creating the monitoring package further comprises:
receiving access to the PIMS and social network profile is granted via access credentials provided by the user, wherein integrating enables read and write access to calendar applications, e-mail applications, and social media networks associated with the user; and
storing the access credentials on a database.

7. The computer-implemented method of claim 1 further comprising:
generating feedback based on meeting outcomes, wherein generating feedback comprises:
displaying, by a user interface on a computing device, one or more responsive prompts and e-mail surveys to the participants about the effectiveness of the meeting; and
comparing feedback input received from the participants with previous feedback input from the participants from similar meetings.

8. A computer program product for setting up a room, the computer program product comprising:
one or more computer readable storage devices and program instructions stored on the one or more computer readable storage devices, the stored program instructions comprising:
program instructions to create a monitoring package by integrating a personal information management system (PIMS) and a social network profile for a user, wherein creating the monitoring package comprises:
program instructions to continuously monitor e-mail messages, calendar entries, social media posts, and social media comments of the integrated PIMS and social network profile;
program instructions to collect participant preference information and meeting data from the monitoring package by enabling participants to enter preferences onto a list of configurable items for a conference room setup;
program instructions to collect a set of participant preference information for the participants on a list of participants including the participant preference information for the user;
program instructions to identify an upcoming meeting for the user according to the meeting data;
program instructions to determine the list of participants for the upcoming meeting based on conversation threads associated with the upcoming meeting collected from the monitoring package;
program instructions to determine a workplace set-up for the upcoming meeting based on the set of participant preference information;
program instructions to dynamically adjust lights of a room in real-time based on the set of participant preference information;
program instructions to output a generated custom and proactively selected workplace arrangement for a given event based at least in part on previously stored room styles and the determined workplace set-up for the upcoming meeting, meeting time, and participants information; and
program instructions to integrate with a control hub and arrange a conference room, wherein arranging the conference room comprises:
program instructions to establish the conference room seating arrangement based on saved personality traits of the participants attending the meeting and positional hierarchy.

9. The computer program product of claim 8 further comprising:
program instructions to generate a data model for the participants based on the set of participant preference information and participant data.

10. The computer program product of claim 8 further comprising:
program instructions to determine an overall preferred setting of the participants attending the upcoming meeting, wherein determining the overall preferred settings comprises:
program instructions to analyze the set of participant preference information;
program instructions to intersect the participant preference information of the participants attending the upcoming meeting; and
program instructions to weigh the participant preference information of the participants attending the detected upcoming meeting based on participant hierarchy.

11. The computer program product of claim 10, wherein intersecting further comprises:
program instructions to identify common characteristics in the participant preference information.

12. The computer program product of claim 8 further comprising:
program instructions to analyze meeting space information.

13. The computer program product of claim 8, wherein integrating and creating the monitoring package further comprises:
program instructions to receive access to the PIMS and social network profile is granted via access credentials provided by the user, wherein integrating enables read and write access to calendar applications, e-mail applications, and social media networks associated with the user; and
program instructions to store the access credentials on a database.

14. The computer program product of claim 8 further comprising:
program instructions to generate feedback based on meeting outcomes, wherein generating feedback comprises:
program instructions to display responsive prompts and e-mail surveys to the participants about the effectiveness of the meeting; and program instructions to compare feedback input received from the participants with previous feedback input from the participants from similar meetings.

15. A computer system for setting up a room, the computer system comprising:
one or more computer processors;
one or more computer readable storage devices; and
program instructions stored on the one or more computer readable storage devices for execution by at least one of the one or more computer processors, the stored program instructions comprising:
program instructions to create a monitoring package by integrating a personal information management system (PIMS) and a social network profile for a user, wherein creating the monitoring package comprises:
program instructions to continuously monitor e-mail messages, calendar entries, social media posts, and social media comments of the integrated PIMS and social network profile;
program instructions to collect participant preference information and meeting data from the monitoring package by enabling participants to enter preferences onto a list of configurable items for a conference room setup;
program instructions to collect a set of participant preference information for the participants on a list of participants including the participant preference information for the user;
program instructions to identify an upcoming meeting for the user according to the meeting data;
program instructions to determine the list of participants for the upcoming meeting based on conversation threads associated with the upcoming meeting collected from the monitoring package;
program instructions to determine a workplace set-up for the upcoming meeting based on the set of participant preference information;
program instructions to dynamically adjust lights of a room in real-time based on the set of participant preference information;
program instructions to output a generated custom and proactively selected workplace arrangement for a given event based at least in part on previously stored room styles and the determined workplace set-up for the upcoming meeting, meeting time, and participants information; and
program instructions to integrate with a control hub and arrange a conference room, wherein arranging the conference room comprises:
program instructions to establish the conference room seating arrangement based on saved personality traits of the participants attending the meeting and positional hierarchy.

16. The computer system of claim 15 further comprising:
program instructions to generate a data model for the participants based on the set of participant preference information and participant data.

17. The computer system of claim 15, further comprising:
program instructions to determine an overall preferred setting of the participants attending the upcoming meeting, wherein determining the overall preferred settings comprises:
program instructions to analyze the set of participant preference information; program instructions to intersect the participant preference information of the participants attending the upcoming meeting, wherein intersecting further comprises:
program instructions to identify common characteristics in the participant preference information; and
program instructions to weigh the participant preference information of the participants attending the detected upcoming meeting based on participant hierarchy.

18. The computer system of claim 15 further comprising:
program instructions to analyze meeting space information.

19. The computer system of claim 15, wherein integrating and creating the monitoring package further comprises:
program instructions to receive access to the PIMS and social network profile is granted via access credentials provided by the user, wherein integrating enables read and write access to calendar applications, e-mail applications, and social media networks associated with the user; and
program instructions to store the access credentials on a database.

20. The computer system of claim 15 further comprising:
program instructions to generate feedback based on meeting outcomes, wherein generating feedback comprises:
program instructions to display responsive prompts and e-mail surveys to the participants about the effectiveness of the meeting; and
program instructions to compare the feedback input received from the participants with previous feedback input from the participants from similar meetings.

* * * * *